US012736486B2

(12) United States Patent
Soua et al.

(10) Patent No.: US 12,736,486 B2
(45) Date of Patent: Sep. 15, 2026

(54) DIFFERENTIATION OF CLASTIC SEDIMENTARY SYSTEMS USING MARCH-DOLLASE PREFERRED ORIENTATION ACTOR

(71) Applicant: SAUDI ARABIAN OIL COMPANY, Dhahran (SA)

(72) Inventors: Mohamed Soua, Dhahran (SA); Husinsyah Sitepu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 428 days.

(21) Appl. No.: 18/355,490

(22) Filed: Jul. 20, 2023

(65) Prior Publication Data

US 2025/0027891 A1 Jan. 23, 2025

(51) Int. Cl.
*G01N 23/2055* (2018.01)
*G01N 23/207* (2018.01)

(52) U.S. Cl.
CPC ....... *G01N 23/2055* (2013.01); *G01N 23/207* (2013.01); *G01N 2223/0566* (2013.01); *G01N 2223/1016* (2013.01); *G01N 2223/606* (2013.01); *G01N 2223/616* (2013.01)

(58) Field of Classification Search
CPC ............. G01N 23/2055; G01N 23/207; G01N 2223/0566; G01N 2223/1016; G01N 2223/606; G01N 2223/616
See application file for complete search history.

(56) References Cited

U.S. PATENT DOCUMENTS 6,177,396 B1 * 1/2001 Clapperton ........ C11D 17/0026 510/340
10,330,658 B2 * 6/2019 Lander ................ G01N 33/383
2006/0252031 A1 * 11/2006 Abbott ............. B01L 3/502761 435/5

OTHER PUBLICATIONS

Type define by Cambridge Dictionary, Feb. 3, 2026, 1 page (Year: 2026).*
Dollase, W.A.: "Correction of Intensities for Preferred Orientation in Powder Diffractometry: Application of the March Model," Journal of Applied Crystallography, vol. 19, No. 4, Aug. 1986, pp. 267-272.
O'Connor, B.H., Li, D.Y. and Sitepu, H.: "Strategies for Preferred Orientation Corrections in X-ray Powder Diffraction Using Line Intensity Ratios," Advances in X-ray Analysis, vol. 34, 1991, pp. 409-415.

(Continued)

*Primary Examiner* — Tung S Lau
(74) *Attorney, Agent, or Firm* — Vorys, Sater, Seymour and Pease LLP

(57) ABSTRACT

Methods and tools to identify a type of sedimentary system from an XRD pattern. The method includes applying x-rays to a sample to obtain diffraction pattern data, and calculating a March-Dollase preferred orientation factor of a crystallographic plane of the sample based on the diffraction pattern data. The method further includes classifying the calculated March-Dollase preferred orientation factor to identify a type of clastic sedimentary system corresponding to the sample. A rapid sediment analyzer tool includes an X-ray diffraction device and an application having a March-Dollase preferred orientation factor calculator and a classifier. The display device is configured to display the identified type of clastic sedimentary system.

14 Claims, 6 Drawing Sheets

(56) References Cited

OTHER PUBLICATIONS

O'Connor, B.H., Li, D.Y. and Sitepu, H.: "Texture Characterization in X-ray Powder Diffraction Using the March Formula," Advances in X-ray Analysis, vol. 35, 1992, pp. 277-283.
Sitepu, H., Prask, H.J. and Vaudin, M.D.: "Texture Characterization in X-ray and Neutron Powder Diffraction Data Using the Generalized Spherical Harmonic," Advances in X-ray Analysis, vol. 44, 2001, pp. 241-246.
Li, D., O'Connor, B.H., and Sitepu, H.,: "Comparative Evaluation of the March and Generalized Spherical Harmonic Preferred Orientation Models Using X-ray Diffraction Data for Molybdite and Calcite Powders," Journal of Applied Crystallography vol. 38, No. 1, Feb. 2005, pp. 158-167.
Sitepu, H.: "Texture and Structural Refinement Using Neutron Diffraction Data from Molybdite (MoO3) and Calcite (CaCO3) Powders and a Ni-rich Ni50.7Ti49.30 Alloy," Powder Diffraction, vol. 24, No. 4, Dec. 2009, pp. 315-326.
Sanei, H., Ardakani, O.H., Akai, T et al. Core versus cuttings samples for geochemical and petrophysical analysis of unconventional reservoir rocks. Sci Rep 10, 7920 (2020).
Mackowiak, Trevor & Perdrial, Nico. (2023). Monitoring of Suspended Sediment Mineralogy in Puerto-Rican Rivers: Effects of Flowrate and Lithology. Minerals. 13. 208.
Basic Concepts of Crystallography; retrieved from https://www3.nd.edu/~amoukasi/CBE30361 Lecture_crystallography_B.pdf; Jul. 2023.
Kelsey Jorgensen, Materials 100A; Step-by-Step Guide to Crystallographic Points, Directions, and Planes, Dec. 13, 2015; retrieved from https://www.mrl.ucsb.edu/~seshadri/2017_100A/GuideToPointsDirectionsPlanes.pdf; Jul. 2023.
Speakman, Scott A.; MIT Center for Materials Science and Engineering; Fundamentals of Rietveld Refinement I. Xrd Pattern Calculation and Refinement Parameters; An Introduction to Rietveld Refinement using PANalytical X'Pert HighScore Plus v3.0e; prism.mit.edu/xray.
First examination report dated Apr. 15, 2026 issued by SAIP (Saudi Authority for Intellectual Property) in counterpart SA Application No. SA 1020243998, three pages, with machine translation in English.

* cited by examiner 112
211
101
100

| Type of Sedimentary System | Sample ID | Quartz hkl | March-Dollase Factor |
|---|---|---|---|
| Fluvial | C3_14497.4 | 101 | 1.31 |
| Lake | C24_14560.5 | 101 | 1.13 |
| Interdune | C16_14608.4 | 101 | 1.09 |
| Dune | C4_14506.6 | 101 | 0.99 |

DIFFERENTIATION OF CLASTIC SEDIMENTARY SYSTEMS USING MARCH-DOLLASE PREFERRED ORIENTATION ACTOR

FIELD OF THE DISCLOSURE

The present disclosure relates generally to mineralogy and, more particularly, to sedimentary analysis and identification.

BACKGROUND OF THE DISCLOSURE

Sedimentary analysis is important in many applications. Samples of sediment are collected and later analyzed using a number of different techniques to determine the composition of the sediment. The composition of the sediment and other measurements or observations can be further used to determine a type of sedimentary system in which the sample belonged. For example, extractive industries often drill and obtain samples of sedimentary rock in different locations of a geographic area. The geographic area can have different types of sedimentary systems. Samples can be drawn from core samples or drilling cuttings. Collected samples are then taken to a laboratory or other site for further analysis.

In one application, a petrographer receives thin section (TS) slides of sediment taken from a core sample. For example, on average, a petroleum exploration core laboratory may receive hundreds of cutting and core samples on a hotshot basis to determine their depositional models by means of petrography. Conventional processing of TS slides takes a few hours to days to be performed. Further delay of a few more hours or more occurs for a petrographer to reliably determine a depositional environment.

What is needed is a rapid and lower cost way to analyze a depositional environment in a sedimentary system. In particular, what is needed is a rapid and lower cost way to identify a clastic sedimentary system.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method of identifying a type of sedimentary system from a sample is provided. The method includes applying x-rays to a sample to obtain diffraction pattern data, and calculating a March-Dollase preferred orientation factor of a crystallographic plane of the sample based on the diffraction pattern data. The method further includes classifying the calculated March-Dollase preferred orientation factor to identify a type of clastic sedimentary system corresponding to the sample.

In another embodiment, a rapid sediment analyzer tool includes an X-ray diffraction device and a computing device having a March-Dollase preferred orientation factor calculator and classifier. The X-ray diffraction device is configured to apply x-rays to a sample to acquire diffraction pattern data. The March-Dollase factor calculator is configured to calculate a March-Dollase factor of a crystallographic plane of the sample based on the diffraction pattern data. The classifier is configured to classify the calculated March-Dollase preferred orientation factor to identify a type of clastic sedimentary system corresponding to the sample.

In a further embodiment, computer program product device has a non-transitory computer-readable memory having instructions executable by at least one processor to perform the following operations: calculating a March-Dollase preferred orientation factor of a crystallographic plane of a sample based on diffraction pattern data obtained by an X-ray diffraction device, and classifying the calculated March-Dollase preferred orientation factor to identify a type of clastic sedimentary system corresponding to the sample.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
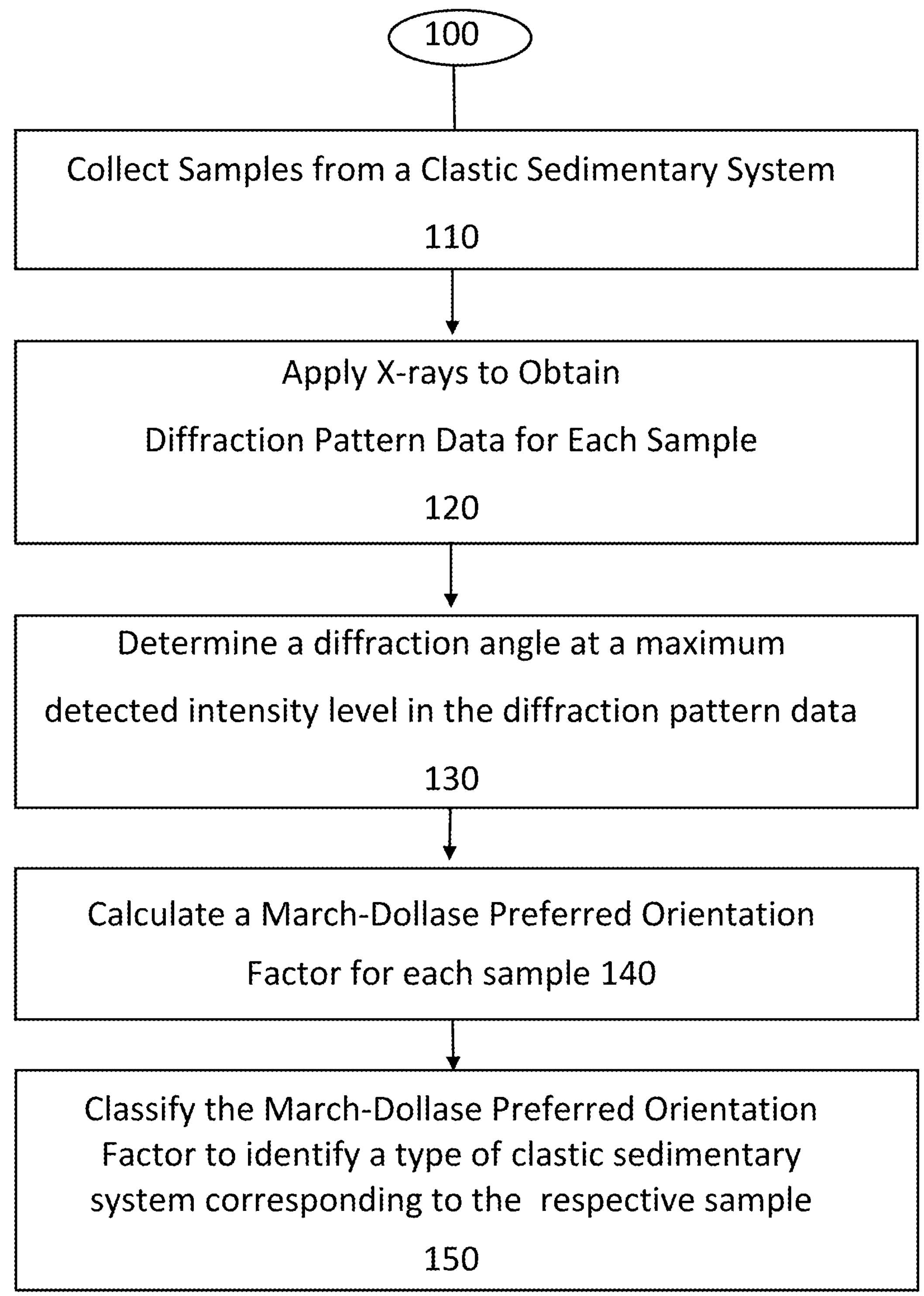
FIG. 1 is a flowchart diagram of a method for identifying a type of clastic sedimentary system based on a calculated March-Dollase preferred orientation factor according to an embodiment of the present invention.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to mineralogy and, more particularly, to rapid analysis and identification of a type of clastic sedimentary system based on a March-Dollase preferred orientation factor of a sample.

"Petroleum" as used herein refers to hydrocarbons, including crude oil, natural gas liquids, natural gas and their products.

"Clastic sedimentary system" as used herein refers to a sedimentary composition that includes fragments of clastic rocks, minerals, and/or sediments. For example, clastic rocks and sediments may include, but are not limited to, conglomerate, sandstone, siltstone, shale, or claystone, and can have different sized particles, mineral compositions or textures depending upon an environment.

A "type" of clastic sedimentary system as used herein refers to a region having a similar sedimentary composition. Examples of types of clastic sedimentary systems may include, but are not limited to, areas of fluvial, lake shoreline, interdune, or dune sandstone having a mineral composition that includes quartz. Examples of regions having a similar sedimentary composition may include, but are not limited to, geographic areas, hydrocarbon reservoirs or basins suitable for gas or oil wellfields, drilling, hydraulic fracking, or other petroleum or extractive industry activity. The terms "X-ray" and "x-ray" are used interchangeably herein.

Methods

FIG. 1 is a flowchart diagram of a method 100 for identifying a type of clastic sedimentary system based on a calculated March-Dollase preferred orientation factor (steps 110-150).

Sample Collection

First, one or more samples from a clastic sedimentary system are collected (step 110). In one example, one or more slides are prepared which have samples taken from a clastic sedimentary system. For example, these samples may be drawn from core samples or drilling cuttings and placed in the slides. In one feature, the slides may be prepared for X-ray diffraction (also called XRD slides). XRD slides typically take less time and effort to prepare compared to thin-section (TS) slides. However, the invention is not so limited and a sample may be prepared on an XRD slide, TS slide or other type of slide, substrate or holder suitable for holding a sedimentary composition in place during X-ray diffraction.

X-Ray Diffraction

Next, x-rays are applied to a sample to obtain diffraction pattern data for the sample (step 120). For example, a sample may be placed in an X-ray diffraction (XRD) device (also called an X-ray diffractometer) to apply x-rays upon the sample and obtain a diffraction pattern. In one example, the sample includes quartz having a crystallographic plane orientation <101>. The diffraction pattern data produced by the XRD device may include intensity levels of diffraction at different diffraction angles relative to the orientation of the sample and other pertinent data, such as, a wavelength of the X-ray source and an angle of incidence of the radiation emitted from the X-ray source relative to a surface or plane of the sample. When multiple planes of crystal lattice are hit by X-rays, the intensity levels of diffraction may also include overlapping between reflected peaks.

In step 130, a diffraction angle corresponding to a maximum in a detected intensity level in the diffraction pattern data is determined. In one example, the quartz having a crystallographic plane orientation <101> may be associated with a d-space of about 3.34 Angstroms. Here d-space refers to the distance between planes of atoms in the quartz that give rise to diffraction peaks (also called maximum points in the diffraction pattern data) which occur at different diffraction angles. In this way, diffraction pattern data is obtained which may further include the determined diffraction angles at maximum points and d-spacing.

March-Dollase Preferred Orientation Factor Classification

Next, a March-Dollase preferred orientation factor is calculated for a crystallographic plane of the sample based on the diffraction pattern data (step 140). In one example, a March-Dollase factor may be calculated for a sample at a quartz plane <101>. The March-Dollase factor may be calculated according to the March model described by Dollase, Dollase, W. A., "Correction of Intensities for Preferred Orientation in Powder Diffractometry: Application of the March Model," *Journal of Applied Crystallography*, Vol. 19, No. 4, August 1986, pp. 267-272.

In one embodiment, a March-Dollase preferred orientation factor $P_j$ is calculated for a crystallographic plane of the sample according to the following equation:

$$P_j = \left[r^{-1}\sin^2\theta_j + r^2\cos^2\theta_j\right]^{-3/2}$$

where $\theta_j$ is the angle between the direction of crystallographic preferred orientation and the reciprocal-lattice vector for the Bragg peak that is corrected, and j is a suffix. The single March parameter r controls the distribution shape. In addition, it is an index of the extent of preferred direction; r parameter being unity for an ideal random orientation powder diffraction data.

The March model does not require the use of data acquired with a multi-axis diffractometer for the correction of intensities due to the preferred orientation direction effects. The March model is symmetric and smooth across $\theta_j=0°$ and $\theta_j=90°$. It also yields a preferred orientation correction factor, which has either a maximum or minimum at $\theta_j=0°$, and is normalizable over the full $2\theta_j$ angular range. The normalization is important in that changes in the preferred orientation correction factor shape conserve the total intensity within a powder diffraction pattern.

Finally, in step 150, the calculated March-Dollase preferred orientation factor is classified to identify a type of clastic sedimentary system corresponding to the sample. In one embodiment, the types of clastic sedimentary systems may include one or more different types of sedimentary systems where clastic rocks or minerals have different grain sizes, texture or other properties. In the example described above of a March-Dollase preferred orientation factor calculated for a sample at the quartz plane orientation <101>, the type of clastic sedimentary system includes one or more of fluvial, lake, interdune, or dune types of sedimentary systems. Data for the type of clastic sedimentary system identified may be then be output for storage in memory, transmission over a network or display.

Figures 2, 3:
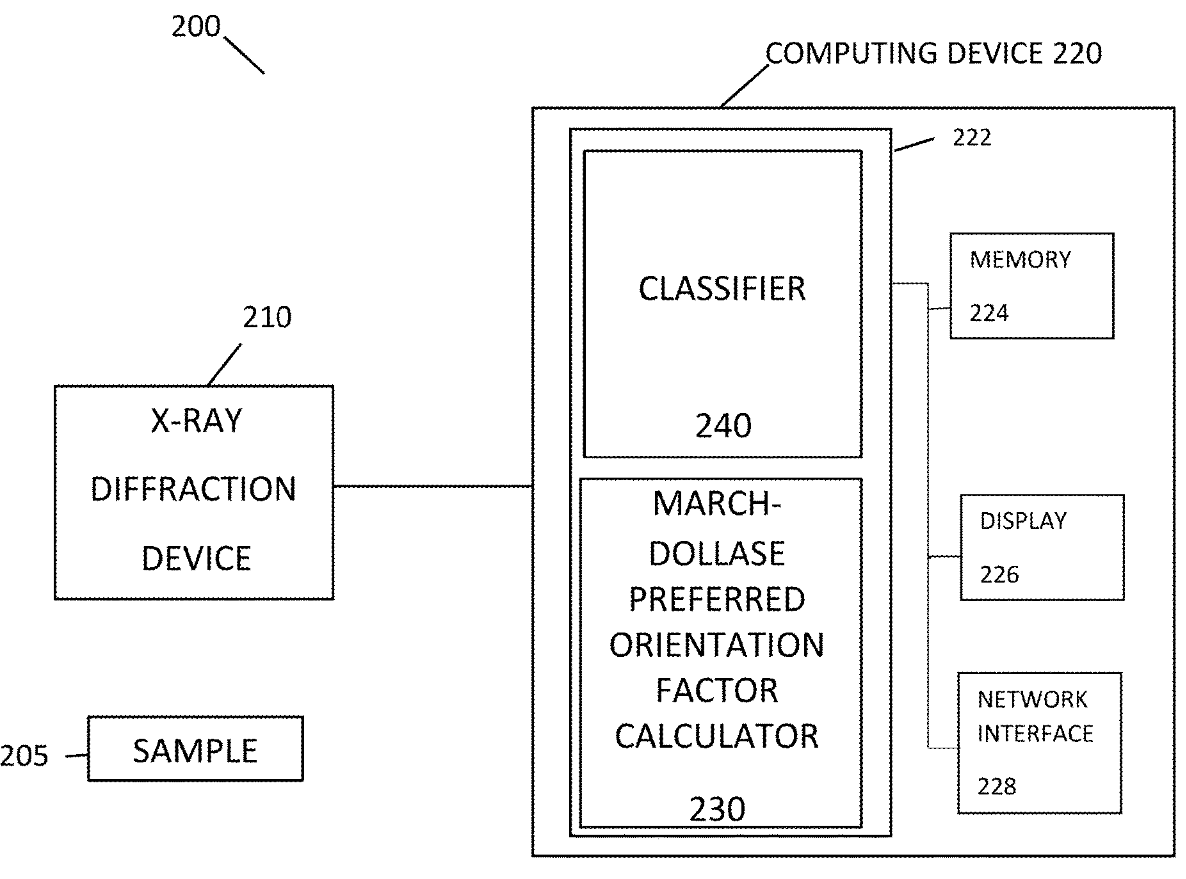
FIG. 2 is a diagram of rapid analyzer tool according to an embodiment of the present invention.
FIG. 3 is a diagram illustrating basic quartz crystal axes and facets in one example.

FIG. 2 is a diagram of rapid analyzer tool 200 according to an embodiment of the present invention. Rapid sediment analyzer tool 200 includes an X-ray diffraction device 210 and a computing device 220. Computing device 220 includes at least one processor 222, non-transitory computer-readable memory 224, a display device 226, and a network interface 228. In one embodiment, computing device 220 includes a March-Dollase preferred orientation factor calculator 230 and a classifier 240.

X-ray diffraction (XRD) device 210 is configured to apply X-rays to a sample 205 to obtain diffraction pattern data for the sample. XRD device 210, for example, may apply X-rays to obtain diffraction pattern data as described above with respect to step 120. XRD device 210 may be any type of X-ray diffraction device or diffractometer that produces diffraction patterns representative of lattice structures of crystallographic material in sample 205 by varying the angle of incidence of an X-ray beam from an X-ray source. XRD device 210 may capture and store diffraction pattern data as described above for steps 120 and 130. For example, XRD device 210 can detect intensity levels and determine diffraction angles at maximum points (diffraction peaks) as described with respect to step 130. The detected diffraction pattern data may be output by XRD device 210 for storage in memory 224 (or other storage device such as a database).

March-Dollase preferred orientation factor calculator 230 is configured to calculate a March-Dollase factor of a crystallographic plane of the sample based on the diffraction pattern data. March-Dollase preferred orientation factor calculator 230 may calculate a March-Dollase preferred orientation factor as described above with respect to step 140. Classifier 240 is configured to classify the calculated March-Dollase preferred orientation factor to identify a type of clastic sedimentary system corresponding to the sample. Classifier 240 may classify the March-Dollase preferred orientation factor as described above with respect to step 150 to identify a type of clastic sedimentary system corresponding to sample 205.

In example implementations, March-Dollase preferred orientation factor calculator 230 and classifier 240 may be implemented in software, firmware, hardware or any combination thereof. In one embodiment as shown in FIG. 2, March-Dollase preferred orientation factor calculator 230 and classifier 240 may be implemented to execute on processor 222 and to store and retrieve data from memory 224. For example, March-Dollase preferred orientation factor calculator 230 and classifier 240 may be implemented as computer-readable instructions (such as a program) stored in memory 224 and executed by processor 222. Output data, such as, the type of clastic sedimentary system identified by classifier 240, may be stored in memory 224, displayed to a user on display device 226, or output over a data network through network-interface 228.

Methods, systems and operation of embodiments are described further below with respect to example results obtained by the inventors in tests.

Example Results and Discussion

Example experiments are results are discussed below. These experiments and results are illustrative and not intended to be limiting.

In experiments, the inventors identified a new, innovative use for the March-Dollase preferred crystallographic orientation parameter plane of quartz as a diagnostic to distinguish between types of sedimentary systems, such as, facies of the Permian Tinat Member (Unayzah Group) in eastern Saudia Arabia. The test results show a successful diagnostic use to distinguish between fluvial, lake shoreline, interdune and dune sandstone when the crystallographic plane <101> of quartz was taken as the direction of a preferred crystallographic orientation parameter (or cleavage).

Figure 4:
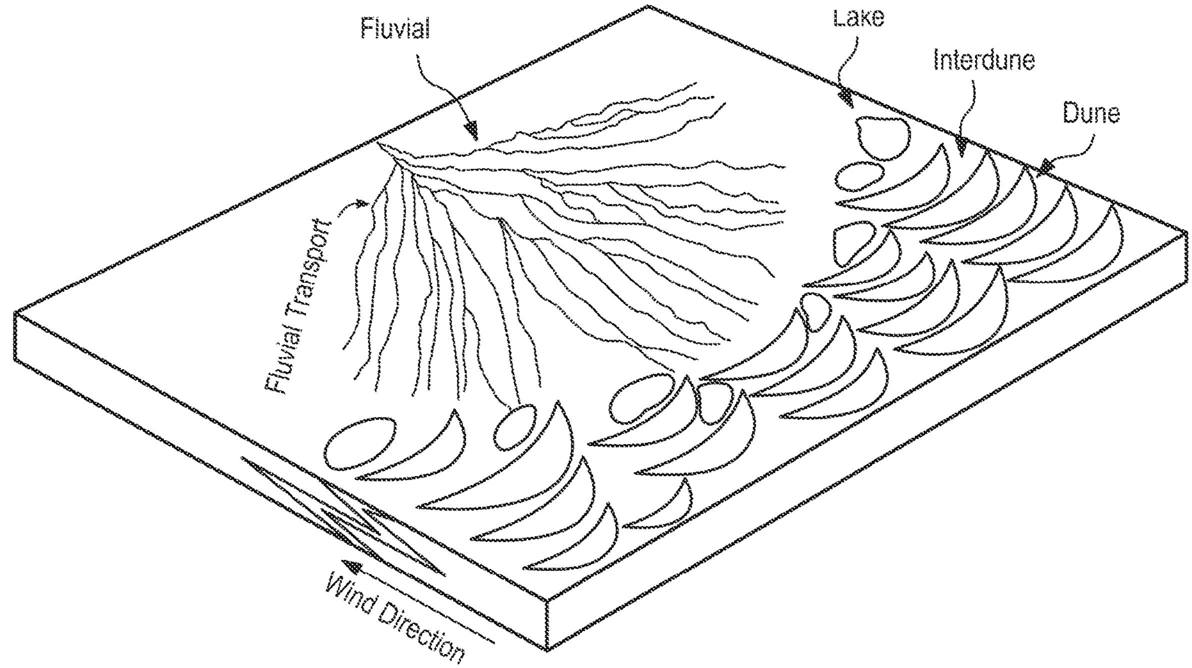
FIG. 4 is a diagram showing a model of example sedimentary systems with different depositional environments.

For example, consider models for quartz and types of sedimentary systems in further detail. FIG. 3 is a diagram illustrating basic quartz crystal axes and facets in one example. Facets of the quartz have respective crystallographic planes, such as, planes <100>. <101>, <112>, and <211>. FIG. 4 is a diagram showing a model of example sedimentary systems with different depositional environments representative of the types of clastic sedimentary systems found in the Permian Tinat Member (Unayzah Group) in eastern Saudia Arabia where the samples were collected. As shown in the model of FIG. 4, the types of clastic sedimentary systems (also referred to as facies) can include fluvial facies, shoreline lake facies, interdune facies, and dune facies.

The inventors used several preferred orientation directions in a Rietveld refinement of all X-ray powder diffraction data (XRD) data sets of quartz and the <101> plane provided good agreement between (i) the measured and calculated whole-pattern fittings, and (ii) the refined crystal structure refinements with the single crystal XRD data as reasonable values of crystallographic R-factors. This is mainly because the highest peak to background ratio is the <101> reflection of XRD data. The March-Dollase preferred crystallographic orientation parameter r controls the distribution shape, which is based on an assumption of the model structure of the quartz grain-size that is associated with the transport energy and provenance of the sedimentary system where quartz is the dominant mineral composing matrices of these samples.

When the March-Dollase model was used in the Rietveld refinement to correct the intensities due to the effect of the preferred orientation, quantitative phase analysis of whole-diffraction pattern XRD revealed that the matrices consist mainly of quartz (94.0 wt %) with minor feldspar, dolomite, anhydrite, halite and hematite (1.0 wt %). Additionally, clay minerals including illite, kaolinite, and chlorite account for (5.0 wt %). Sample preparation was taken with great care in order to minimize preferred orientation. Because the March-Dollase parameter is utilized, caution has been exercised to ensure baselines in the XRD pattern data are not negatively influenced by minor mineral constituents other than quartz.

Results of these experiments indicate that the March-Dollase preferred orientation parameter is changing according to the sedimentary systems determined by petrography analysis. Based on increasing energy of the depositional environment, the fluvial facies accounts for 1.31, the shoreline lake facies 1.13, followed by the interdune facies of 1.09 and finally the dune facies of 0.99. In this way, results in inventors' experiments confirmed X-ray diffraction patterns obtained over a relative range of angles to analyze crystal structure on the crystallographic plane <101> of quartz reliably determine a particular facie.

For comparison purposes, the samples utilized in these tests were used previously in a petrography workflow to identify the sedimentary systems separately along with detailed core description in a sedimentological workflow. Petrography analysis performed on these samples described quartz grain size and facies. X-ray diffraction was used on the same samples as a separate technique to identify the phase composition of the samples. The XRD patterns produced by crystallographic planes of minerals were utilized to perform crystal structure analysis and compute the March-Dollase factor for the quartz plane <101>.

The inventors identified clastic sedimentary systems separately using petrography analysis by means of thin-section slides along with detailed core description. X-ray powder diffraction data and Rietveld method were used on the same samples in aim to determine the phase identification and quantification of the samples' mineral composition. The integration of all tools were used to confirm the reliability of identifying these sedimentary facies using a March-Dollase r parameter as described above with respect to method 100 and tool 200.

The petrography thin-sections on these samples described grain size and depositional environment. The samples were carefully prepared to minimize the preferred orientation to acquire high quality results of the March-Dollase preferred orientation correction factor without being influenced. The inventors applied similar grinding technique for all samples used for the experiment tests. Samples were prepared by tamping the loose powder in the slide cavity utilizing a razor blade. The use of a razor-sharp edge minimizes the preferred orientation during the sample preparation prior to measuring or obtaining the XRD data.

To preserve the crystal lattices, the same grinding process and time using a micronizing mill device was applied for the different samples. The application of such process is used to refute the claim that weakening of the crystal lattice is related to the broadening of the quartz peak 101. For instance, if a different grinding technique was utilized for each sample, when significant pressure was applied, this can decrease the peak intensities and contribute to the broadening of the quartz diffraction peaks area.

The crystallographic plane <101> (d=3.34 Å) was selected as the principal candidate for the test and was utilized for determining the March-Dollase preferred orientation parameter checked for different samples. To further evaluate potential preferred orientation, other quartz peak intensities of planes (facets) <112>, <022> and <211> were compared to that of quartz plane <101>.

Figure 5:
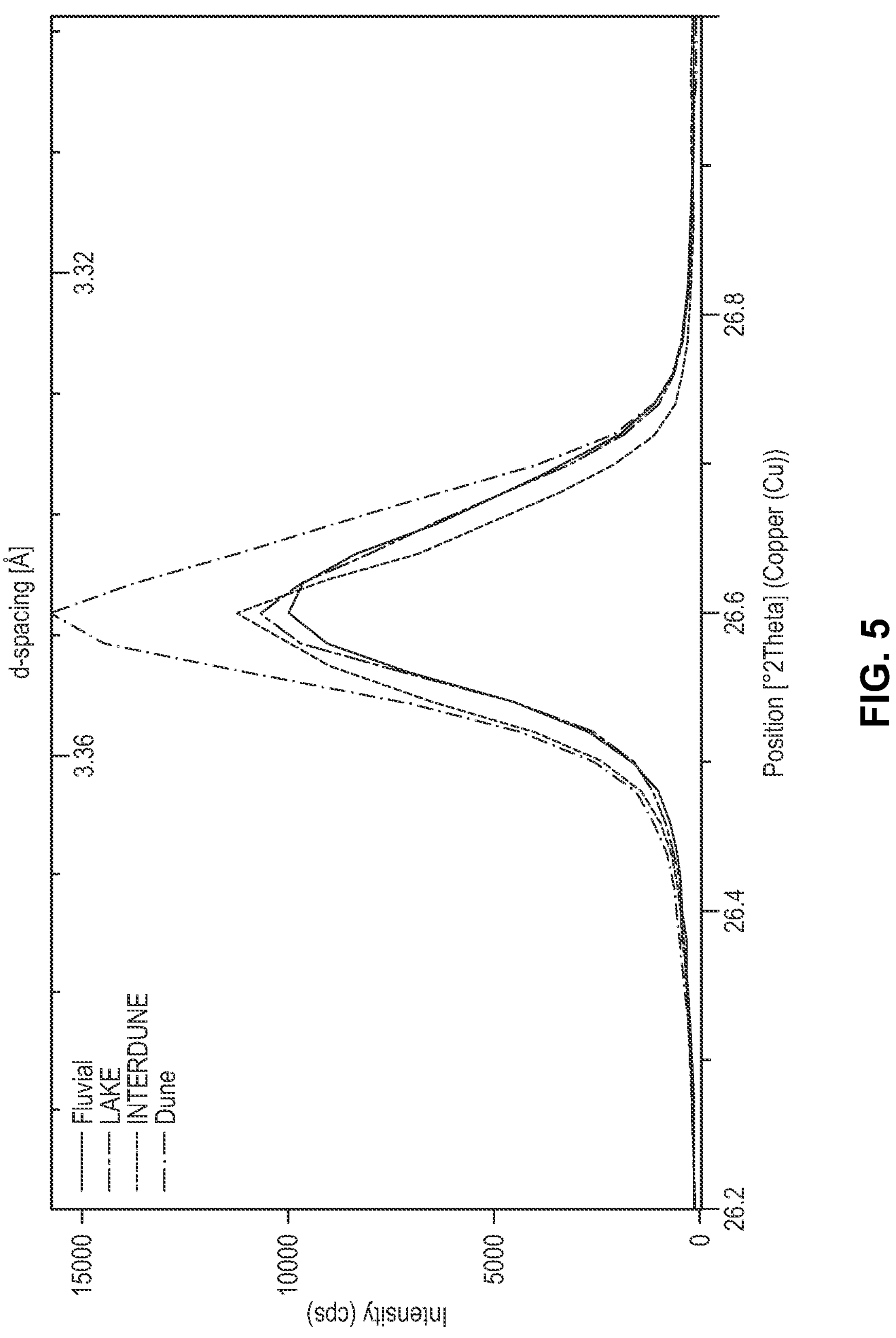
FIG. 5 is a plot diagram illustrating differences in intensity levels between different samples in an x-ray diffraction pattern of a quartz crystallographic plane.
Figures 6, 7:
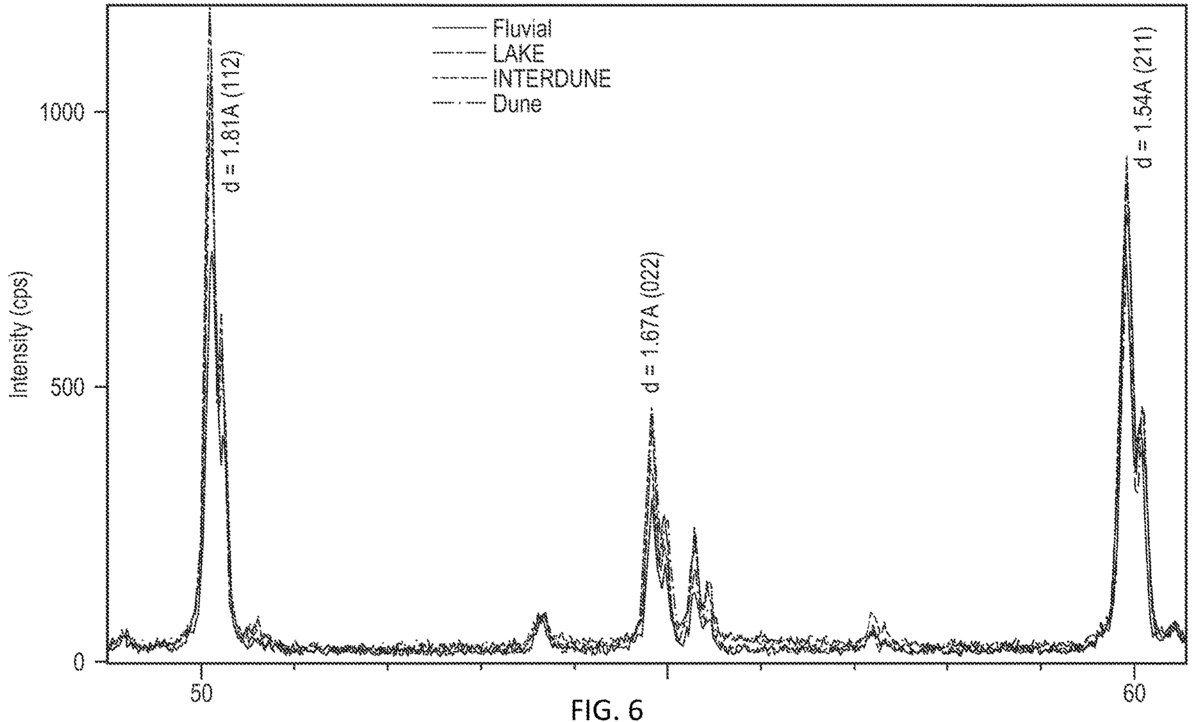
FIG. 6 is a plot diagram illustrating intensity levels between different samples in higher diffraction angles of an x-ray diffraction pattern of different quartz crystallographic planes.
FIG. 7 is a table illustrating variation of the March-Dollase preferred orientation factor of a particular quartz crystallographic plane in different sedimentary systems.

Results for four different samples are shown with respect to FIGS. 5-7. Indeed the intensity levels between different samples at the same diffraction peak show a measurable difference sufficient to distinctly identify a type of sedimentary system. For example, FIG. 5 is a plot diagram illustrating differences in intensity levels between four different samples in an x-ray diffraction pattern of a quartz crystallographic plane <101> (d=3.34 Å). The four plots shown in FIG. 5 indicate different maximum intensity levels at a common diffraction angle of about 26.6° (degrees) for the four respective samples collected from fluvial, shoreline lake, interdune and dune types of sedimentary systems.

Higher diffraction angles had closer intensity levels. FIG. 6 is a further plot diagram illustrating relatively closer intensity levels between the same four sample samples at higher diffraction angles at about 50.2°, 55.8°, and 59.8° respectively of an x-ray diffraction pattern of different quartz crystallographic planes and d-spacing, that is, <112> (d=1.81 Å), <022> (d=167 Å), and <211> (d=1.54 Å). This comparison of intensities at higher diffraction angles shows that powder in samples was not affected by sample preparation.

FIG. 7 is a table illustrating variation of the March-Dollase preferred orientation factor of a particular quartz crystallographic plane for a plane <101> of quartz across the four samples. As shown in FIG. 7, based on increasing energy of the depositional environment, the following March-Dollase preferred orientation factors were calculated: 1.31 for fluvial facies 1.31, 1.13 the shoreline lake facies, 1.09 for interdune facies 1.09, and 0.99 for the dune facies.

In general, the inventors found textural changes in quartz grain size distribution; shape along with morphology variation with respect to the erosional agent (fluvial, acolian, etc.) could be a proxy of influence and might be involved. Normally, because fluvial transport energy is episodic, the grain size distribution is bimodal. However, dune sands on the other hand are unimodal and finer grained because the wind tends to transport and congregate these fine sizes into a deposit leaving behind the coarser sands and pebbles as desert pavement. Besides, the interdune sands are also unimodal in terms of grain-size and tend to be coarser than dune sands.

In the experiments, the March model proposed by Dollase (1989) was used according to:

$$P_j = \left[r^{-1}\sin^2\theta_j + r^2\cos^2\theta_j\right]^{-3/2}$$

where $\theta_j$ is the angle between the direction of crystallographic preferred orientation and the reciprocal-lattice vector for the Bragg peak that is corrected. The single March r parameter controls the distribution shape. In addition, it is an index of the extent of preferred direction; r parameter being unity for an ideal random orientation powder diffraction data. The March model does not require the use of the data acquired with a multi-axis diffractometer for the correction of intensities due to the preferred orientation direction effects. The March model is symmetric and smooth across $\theta_j$=0° and $\theta_j$=90°. It also yields a preferred orientation correction factor, which has either a maximum or minimum at $\theta_j$=0°, and is normalizable over the full $2\theta_j$ angular range. The normalization is important in that changes in the preferred orientation correction factor shape conserve the total intensity within the powder diffraction pattern.

The International Center for Diffraction Data (ICDD) of Powder Diffraction File (PDF) entry 00-046-1045 was used for the structural model of quartz single crystal XRD data. The refined parameters were phase scale factors and the background component of the patterns, lattice parameters, the instrument zero-point 20% (off set in the 2θ scale of goniometer), the Lorentzian and the Gaussian terms of a pseudo-Voigt profile function and anisotropic strain parameters, structural parameters, i.e., x, y, z and frac, and isotropic thermal parameters (Uiso). After the preliminary refinement without preferred orientation correction had converged, the March-Dollase preferred orientation parameter (r) was refined.

The refined structural parameters obtained from Rietveld method with the March-Dollase model for preferred orientation correction agreed well with the single-crystal XRD data of quartz (ICDD-PDF entry 00-046-1045). Additionally, the results revealed that the March-Dollase parameters are changing according to the sedimentary systems determined by petrography.

In tests to obtain reference data, databases were used which were connected to interpreting software to include the International Centre for Diffraction Data (ICDD), which contains a huge database of powder diffraction patterns and the Powder Diffraction File (PDF), which includes the d-spacings (related to angle of diffraction) and relative intensities of observable diffraction peaks. Diffraction peaks in some tests were tests were identified manually and entered to a database for refinement, and then computed based on crystal structure and Bragg's law.

In one implementation, the inventors used the International Center for Diffraction Data (ICDD) of Powder Diffraction File (PDF) entry 00-046-1045 for the structural model of quartz single crystal XRD data. Additionally, the Rietveld refinement of the whole-powder diffraction patters was conducted to obtain good agreement between the refined parameters with the single-crystal XRD data (PDF entry 00-046-10450, and therefore, the refined parameters were firstly phase scale factors and the background component of the patterns. Subsequently, the lattice parameters were refined. Moreover, the instrument zero-point 20% (off set in the 2θ scale of goniometer), the Lorentzian and the Gaussian terms of a pseudo-Voigt profile function and anisotropic strain parameters were refined. Furthermore, structural parameters, such as, x, y, z coordinates, and isotropic thermal parameters (Uiso) were refined. Finally, the March-Dollase preferred orientation parameter (r) was refined.

Advantages

The new described methods and tools provide a rapid, quick look to decide of which type of sedimentary system the subject samples are composed. These methods and tools are based on X-ray diffraction patterns which take very little time to be generated. The phase identification including quartz planes intensities can be quickly computed. This is an alternative way to study a depositional environment in a clastic sedimentary system, which can save time and money.

One advantage from implementing this alternative way to study depositional environment in clastic sedimentary system is to save money and time for the company in order to conduct the analysis and interpretation. For instance, in some applications as a matter of practice, only 6 thin-section slides can be acquired in a day, while a larger number of XRD slides (such as 24 to 48 XRD slides) can be measured and therefore, interpreted using the rapid analysis methods and tools described herein. This use of XRD slides allows more samples to be analyzed per day which saves time and financial expense in assessing different sedimentary systems in advance of drilling or other geologic operation. For example, using the methods and systems as described herein can enhance by at least a factor of three (3) operational throughput and expedite decision making in the case of urgent exploration activities. Further, an improved accuracy is obtained using the methods and systems herein which show a high confidence level when compared to conventional petrography results.

Finally, in further embodiments, additional advantages of the further use of the Rietveld method in tests included: (1) the use of calibration constants computed from literature references (i.e., Z. M, and V values) rather than by laboratory experimentation (saving time); (2) all reflections in a diffraction pattern were explicitly included, irrespective of overlap; and (3) the background was better defined since a continuous function is fitted to the whole powder diffraction pattern. Also, the preferred orientation effects for a March-Dollase factor calculation can be corrected and determined, as described for example by Sitepu, et al. (2005) *J. Appl. Cryst.* 38, 158-167 and Sitepu (2009) *Powder Diff.*, 24, 315-326. A crystal structural and peak profile parameter scan can be refined as part of the same analysis when using an XRD device.

Further Computer-Implemented Embodiments

Computing device 220 can be any type of computing device including, but not limited to, a smartphone, laptop, desktop, tablet, workstation, kiosk or other computing device having at least one processor 222 and a non-transitory computable readable memory 224. Computing device 220 may include a browser, application, and operating system along with a user-interface depending upon a desired configuration.

Computing device 220 may have functionality performed at the same or different physical locations and by one or more processors 222 located at the same or different locations. This may include locations local or remote from XRD device 210. Computing device 220 many also be coupled to different application programming interfaces (APIs) to perform aspects of the functionality described herein. Computing functionality as described herein may also be implemented on a server, cluster of servers, web server, cloud-computing platform and/or other remote service. A client/server architecture may also be implemented as would be apparent to a person skill in the art given this description. For example, computing device 220 may be a mobile computing device, such as a smart phone, coupled to communicate with a remote server having one or more of March-Dollase preferred orientation factor calculator 230 or classifier 240.

Figure 8:
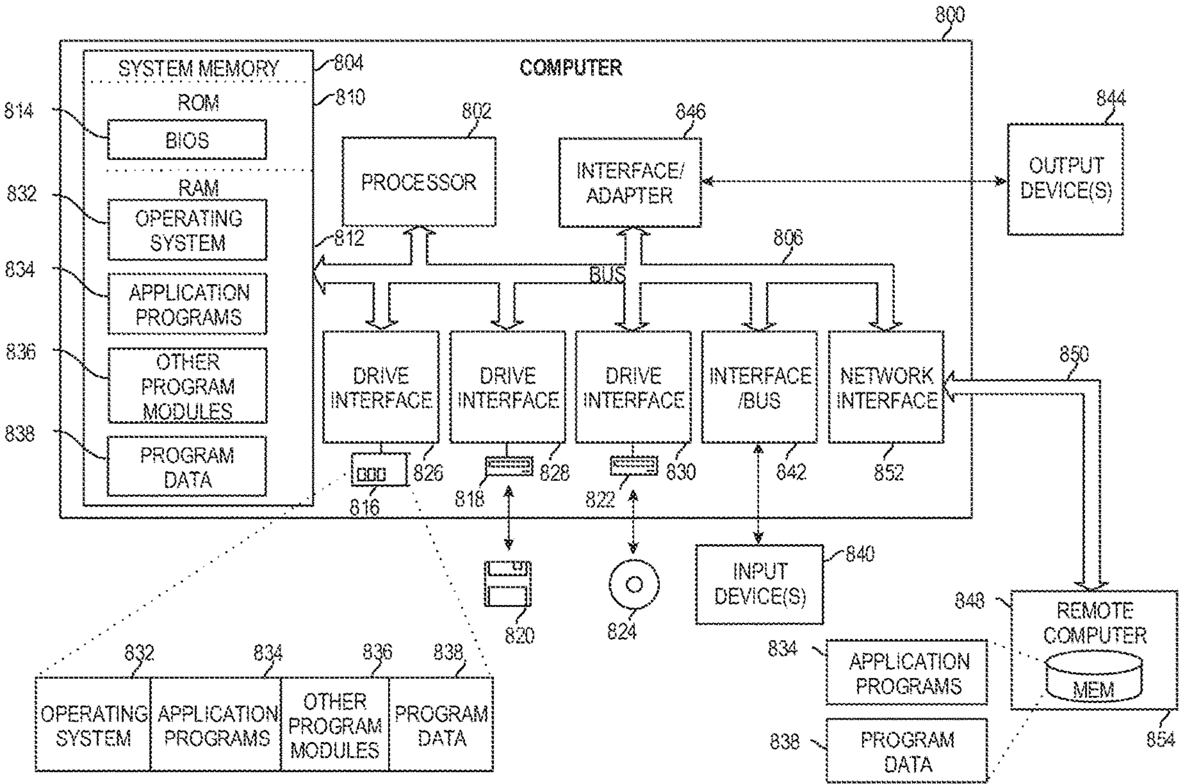
FIG. 8 is a diagram illustrating an example computing device that may be used to implement one or more of the systems or methods described herein in accordance with certain embodiments.

In further embodiments, method 100 and computing device 220 may also be implemented on example computing device 800 shown in FIG. 8. While, for purposes of simplicity of explanation, the example method of FIG. 1 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods, and conversely, some actions may be performed that are omitted from the description.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 8. Furthermore, portions of the embodiments may be a computer program product on a computer-readable storage medium having computer readable program code on the medium. Any non-transitory, tangible storage media possessing structure may be utilized including, but not limited to, static and dynamic storage devices, volatile and non-volatile memories, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to realize a computer implemented process such that the instructions which execute on the computer or other programmable apparatus provide steps for implementing the functions specified in flowchart blocks that may be described herein.

In this regard, FIG. 8 illustrates one example of a computer system 800 that can be employed to execute one or more embodiments of the present disclosure. Computer system 800 can be implemented on one or more general purpose networked computer systems, embedded computer systems, routers, switches, server devices, client devices, various intermediate devices/nodes or standalone computer systems. Additionally, computer system 800 can be implemented on various mobile clients such as, for example, a smartphone, personal digital assistant (PDA), laptop computer, pager, and the like, provided it includes sufficient processing capabilities.

Computer system 800 includes processing unit 802, system memory 804, and system bus 806 that couples various system components, including the system memory 804, to processing unit 802. System memory 804 can include volatile (e.g. RAM, DRAM, SDRAM, Double Data Rate (DDR) RAM, etc.) and non-volatile (e.g. Flash, NAND, etc.) memory. Dual microprocessors and other multi-processor architectures also can be used as processing unit 802. System bus 806 may be any of several types of bus structure including a memory bus or memory controller, a peripheral bus, and a local bus using any of a variety of bus architectures. System memory 804 includes read only memory (ROM) 810 and random access memory (RAM) 812. A basic input/output system (BIOS) 814 can reside in ROM 810 containing the basic routines that help to transfer information among elements within computer system 800.

Computer system 800 can include a hard disk drive 816, magnetic disk drive 818, e.g., to read from or write to removable disk 820, and an optical disk drive 822, e.g., for reading CD-ROM disk 824 or to read from or write to other optical media. Hard disk drive 816, magnetic disk drive 818, and optical disk drive 822 are connected to system bus 806 by a hard disk drive interface 826, a magnetic disk drive interface 828, and an optical drive interface 830, respectively. The drives and associated computer-readable media provide nonvolatile storage of data, data structures, and computer-executable instructions for computer system 800. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 810, including operating system 832, one or more application programs 834, other program modules 836, and program data 838. In some examples, the application programs 834 can include March-Dollase preferred orientation factor calculator 230 or classifier 240, and the program data 838 can include data generated or provided to perform method 100 or operate tool 200. The application programs 834 and program data 838 can include functions and methods programmed to perform processor-implemented functions and control as described herein with respect to method 100 and tool 200 including steps 130-150, such as shown and described herein.

A user may enter commands and information into computer system 800 through one or more input devices 840, such as a pointing device (e.g., a mouse, touch screen), keyboard, microphone, joystick, game pad, scanner, and the like. For instance, the user can employ input device 840 to view a display on display device 226. These and other input devices 840 are often connected to processing unit 802 through a corresponding port interface 842 that is coupled to the system bus, but may be connected by other interfaces, such as a parallel port, serial port, or universal serial bus (USB). One or more output devices 844 (e.g., display, a monitor, printer, projector, or other type of displaying device) is also connected to system bus 806 via interface 846, such as a video adapter.

Computer system 800 may operate in a networked environment using logical connections to one or more remote computers, such as remote computer 848. Remote computer 848 may be a workstation, computer system, router, peer device, or other common network node, and typically includes many or all the elements described relative to computer system 800. The logical connections, schematically indicated at 850, can include a local area network (LAN) and/or a wide area network (WAN), or a combination of these, and can be in a cloud-type architecture, for example configured as private clouds, public clouds, hybrid clouds, and multi-clouds. When used in a LAN networking environment, computer system 800 can be connected to the local network through a network interface or adapter 852. When used in a WAN networking environment, computer system 800 can include a modem, or can be connected to a communications server on the LAN. The modem, which may be internal or external, can be connected to system bus 806 via an appropriate port interface. In a networked environment, application programs 834 or program data 838 depicted relative to computer system 300, or portions thereof, may be stored in a remote memory storage device 854.

Embodiments disclosed herein include: Embodiment A: A method of identifying a type of sedimentary system from a sample comprising the steps of: applying x-rays to a sample to obtain diffraction pattern data for the sample; calculating, with at least one processor, a March-Dollase preferred orientation factor of a crystallographic plane of the sample based on the diffraction pattern data; and classifying, with the at least one processor, the calculated March-Dollase preferred orientation factor to identify a type of clastic sedimentary system corresponding to the sample.

Embodiment A may have one or more of the following additional elements in any combination or all in combination: Element A1: determining a diffraction angle corresponding to a maximum in a detected intensity level in the diffraction pattern data. Element A2: the sample includes quartz having a crystallographic plane orientation <101> and a d-space of about 3.34 Angstroms, and the calculating comprises calculating the March-Dollase preferred orientation factor at the quartz plane orientation <101>. Element A3: the type of clastic sedimentary system includes one or more of fluvial, lake, interdune, or dune types of sedimentary systems. Element A4: outputting data about the identified type of clastic sedimentary system. Element A5: storing output data about the identified type of clastic sedimentary system in non-transistory computer-readable memory or displaying output data about the identified type of clastic sedimentary system on a display view of a display device. Element A6: the type of clastic sedimentary system is at least one of fluvial, lake, interdune, and dune types of sedimentary systems for a wellfield.

Embodiment B: A rapid sediment analyzer tool comprising: an X-ray diffraction device configured to apply x-rays to a sample to obtain diffraction pattern data for the sample; a computing device having a March-Dollase preferred orientation factor calculator and a classifier; wherein the March-Dollase preferred orientation factor calculator is configured to calculate a March-Dollase preferred orientation factor of a crystallographic plane of the sample based on the diffraction pattern data, and wherein the classifier is configured to classify the calculated March-Dollase preferred orientation factor to identify a type of clastic sedimentary system corresponding to the sample.

Embodiment B may have one or more of the following additional elements in any combination or all in combination: Element B1: the X-ray diffraction device is further configured to determine a diffraction angle corresponding to a maximum in a detected intensity level in the diffraction pattern data. Element B2: the sample includes quartz having a crystallographic plane orientation <101> and a d-space of about 3.34 Angstroms, and the March-Dollase preferred orientation factor calculator is configured to calculate the March-Dollase preferred orientation factor at the quartz plane orientation <101>. Element B3: the type of clastic sedimentary system includes one or more of fluvial, lake, interdune, or dune types of sedimentary systems. Element B4: the classifier is further configured to output data about the identified type of clastic sedimentary system for storage in a non-transitory computer-readable memory, transmission over a data network, or display on a display device. Element B4: a display device configured to display the identified type of clastic sedimentary system from the output data.

Embodiment C: a computer program product device comprising non-transitory computer-readable memory having instructions executable by at least one processor to perform the following operations: calculating a March-Dollase preferred orientation factor of a crystallographic plane of a sample based on diffraction pattern data obtained by an X-ray diffraction device, and classifying the calculated March-Dollase preferred orientation factor to identify a type of clastic sedimentary system corresponding to the sample.

Embodiment D: a device comprising: means for calculating a March-Dollase preferred orientation factor of a crystallographic plane of a sample based on diffraction pattern data obtained by an X-ray diffraction device, and means for classifying the calculated March-Dollase preferred orientation factor to identify a type of clastic sedimentary system corresponding to the sample.

Embodiments A to D may further include one or more elements similar to Elements A1-A6 or B1-B4 in any combination or all in combination.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method of identifying a type of sedimentary system from a sample comprising the steps of:

applying x-rays to a sample to obtain diffraction pattern data for the sample;

calculating, with at least one processor, a March-Dollase orientation factor of a crystallographic plane of the sample based on the diffraction pattern data; and classifying, with the at least one processor, the calculated March-Dollase orientation factor to identify a type of clastic sedimentary system corresponding to the sample, wherein the type of clastic sedimentary system includes one or more of fluvial, lake, interdune, or dune types of sedimentary systems and the calculating comprises calculating a March-Dollase preferred orientation factor $P_j$ according to a March model based on the equation:

$$P_j = \left[r^{-1}\sin^2\theta_j + r^2\cos^2\theta_j\right]^{-3/2}$$

where $\theta_j$ is an angle between a direction of crystallographic preferred orientation and a reciprocal-lattice vector for a Bragg peak that is corrected and r is a March parameter.

2. The method of claim 1, further comprising determining a diffraction angle corresponding to a maximum in a detected intensity level in the diffraction pattern data.

3. The method of claim 2, wherein the sample includes quartz having a crystallographic plane orientation <101> and a d-space of about 3.34 Angstroms, and the calculating comprises calculating the March-Dollase orientation factor at the quartz plane orientation <101>.

4. The method of claim 1, wherein the type of clastic sedimentary system includes fluvial, lake, interdune, and dune types of sedimentary systems.

5. The method of claim 1, further comprising outputting data about the identified type of clastic sedimentary system.

6. The method of claim 5, wherein the outputting data includes storing output data about the identified type of clastic sedimentary system in non-transitory computer-readable memory or displaying output data about the identified type of clastic sedimentary system on a display view of a display device.

7. The method of claim 6, wherein the type of clastic sedimentary system includes fluvial, lake, interdune, and dune types of sedimentary systems in a wellfield.

8. A sediment analyzer tool comprising:

an X-ray diffraction device configured to apply x-rays to a sample to obtain diffraction pattern data for the sample;

a computing device having a March-Dollase orientation factor calculator and a classifier implemented on at least one processor;

wherein the March-Dollase orientation factor calculator is configured to calculate a March-Dollase orientation factor of a crystallographic plane of the sample based on the diffraction pattern data, and wherein the classifier is configured to classify the calculated March-Dollase orientation factor to identify a type of clastic sedimentary system corresponding to the sample and wherein the March-Dollase orientation factor calculator is configured to calculate a March-Dollase preferred orientation factor $P_j$ according to a March model based on the equation:

$$P_j = \left[r^{-1}\sin^2\theta_j + r^2\cos^2\theta_j\right]^{-3/2}$$

where $\theta_j$ is an angle between a direction of crystallographic preferred orientation and a reciprocal-lattice vector for a Bragg peak that is corrected and r is a March parameter.

9. The sediment analyzer tool of claim 8, wherein the X-ray diffraction device is further configured to determine a diffraction angle corresponding to a maximum in a detected intensity level in the diffraction pattern data.

10. The sediment analyzer tool of claim 9, wherein the sample includes quartz having a crystallographic plane orientation <101> and a d-space of about 3.34 Angstroms, and the March-Dollase orientation factor calculator is configured to calculate the March-Dollase orientation factor at the quartz plane orientation <101>.

11. The sediment analyzer tool of claim 8, wherein the type of clastic sedimentary system includes fluvial, lake, interdune, and dune types of sedimentary systems in a wellfield.

12. The sediment analyzer tool of claim 8, wherein the classifer is further configured to output data about the identified type of clastic sedimentary system for storage in a non-transitory computer-readable memory, transmission over a data network, or display on a display device.

13. The sediment analyzer tool of claim 12, further comprising a display device configured to display the identified type of clastic sedimentary system from the output data.

14. A sediment analyzer tool comprising:

an X-ray diffraction device configured to apply x-rays to a sample to obtain diffraction pattern data for the sample;

non-transitory computer-readable memory having instructions executable by at least one processor to perform the following operations:

calculating a March-Dollase orientation factor of a crystallographic plane of the sample based on diffraction pattern data obtained by the X-ray diffraction device, and classifying the calculated March-Dollase orientation factor to identify a type of clastic sedimentary system corresponding to the sample, wherein the type of clastic sedimentary system includes one or more of fluvial, lake, interdune, or dune types of sedimentary systems and wherein the calculating operation comprises calculating a March-Dollase preferred orientation factor $P_j$ according to a March model based on the equation:

$$P_j = \left[r^{-1}\sin^2\theta_j + r^2\cos^2\theta_j\right]^{-3/2}$$

where $\theta_j$ is an angle between a direction of crystallographic preferred orientation and a reciprocal-lattice vector for a Bragg peak that is corrected and r is a March parameter.

* * * * *